United States Patent [19]

Katayama

[11] Patent Number: 5,255,252
[45] Date of Patent: Oct. 19, 1993

[54] LIGHT SPOT POSITION DETECTOR AND OPTICAL HEAD

[75] Inventor: Hiroshi Katayama, Higashihiroshima, Japan

[73] Assignee: Sharp Kabushiki Kaisha, Osaka, Japan

[21] Appl. No.: 744,340

[22] Filed: Aug. 13, 1991

[30] Foreign Application Priority Data

Aug. 31, 1990 [JP] Japan ............... 2-231554

[51] Int. Cl.$^5$ ............................... G11B 7/00
[52] U.S. Cl. ............................... 369/44.36
[58] Field of Search ......... 369/44, 35, 44.36, 44.41, 369/44.42, 44.29, 44.31; 250/202, 203.2

[56] References Cited

U.S. PATENT DOCUMENTS

| | | | |
|---|---|---|---|
| 3,470,377 | 9/1969 | Le Febre et al. | 250/203.2 |
| 3,954,340 | 5/1976 | Blomqvist et al. | 250/203.2 |
| 4,001,494 | 1/1977 | Adler et al. | 369/44.41 |
| 5,005,163 | 4/1991 | Yamamoto et al. | 369/44.36 |
| 5,099,468 | 3/1992 | Suzuki et al. | 369/44.36 |

FOREIGN PATENT DOCUMENTS

| | | |
|---|---|---|
| 3928931 | 3/1990 | Fed. Rep. of Germany . |
| 61-276137 | 12/1986 | Japan . |
| 62-28938 | 2/1987 | Japan . |
| 64-79943 | 3/1989 | Japan . |
| 2-154330 | 6/1990 | Japan . |
| 2-260244 | 10/1990 | Japan . |

*Primary Examiner*—Donald E. McElheny, Jr.

[57] ABSTRACT

A light spot position detector, which detects the two-dimensional position of a light spot projected onto a light receiving element with four quadrant light receiving parts, has an amplifier for amplifying detection signals transmitted from the respective light receiving parts individually, an arithmetic circuit for transmitting a first position signal and a second position signal corresponding to the two-dimensional position, and a variable resistor for adjusting the gains of the amplifier and the arithmetic circuit with respect to the detection signals. With this configuration, the amount of crosstalk between the first and second position signals is restrained within a given range, the crosstalk occurring when there are variations in gain of the amplifier and of the arithmetic circuit with respect to the respective detection signals. When the light spot position detector is incorporated into an optical head and the optical head is designed such that the movement of the objective lens causes a shift in the light spot, the displacement of the objective lens can be correctly detected, achieving accurate tracking control and focussing control.

15 Claims, 4 Drawing Sheets

LIGHT SPOT POSITION DETECTOR AND OPTICAL HEAD

FIELD OF THE INVENTION

The present invention relates to an optical head for recording information on and reproducing information from an optical recording medium such as optical disk, and to a light spot position detector that is incorporated into the optical head as a device for detecting the position of an objective lens.

BACKGROUND OF THE INVENTION

An optical head incorporated into an optical recording and reproducing device irradiates laser light through an objective lens on an optical recording medium during the recording and reproduction of signals. A detector incorporated in the optical head detects reflected light from the recording medium through the objective lens. In accordance with this detection, a focus error signal and a tracking error signal are generated. Consequently, the laser light can accurately trace a recording track on the recording medium. A feedback control is executed so as to make these error signals equal zero. Accordingly, the objective lens is moved along a focusing direction and a direction orthogonal to both the focusing direction and track direction (hereinafter referred to as a bias direction), i.e. its position and/or attitude are corrected.

However, when the objective lens is moved along the bias direction to correct a tracking error, the central axis of a light beam from the light source does not pass through the center of the objective lens. Accordingly, the path of the reflected light shifts, which causes the irradiating position of reflected light on the detector to shift.

Thus, even when tracking control is performed accurately, a spurious tracking error signal may be generated. Namely, a conventional optical head presents a drawback in that the tracking error signal may contain both a true tracking error signal and a spurious tracking error signal which corresponds to the displacement of the objective lens in the bias direction.

In order to solve such a problem, for example, a light spot position detector that detects the degree of displacement of objective lens, disclosed in Japanese Publication for Unexamined Patent No. 1989-79943, is known. As shown in FIG. 5, a light source 22 (or the light source 22 reflected in a mirror) is placed in a position opposite to a four-quadrant light receiving element 21. A light spot 23 is projected from the light source 22 onto the light receiving element 21. Although not shown in the figure, the light source 22 is designed to move together with the objective lens. Moreover, when the central axis of the light beam emitted from the light source of the optical head passes through the center of the objective lens, the center of the light spot 23 coincides with the intersection of two dividing lines of the light receiving element 21 (hereinafter referred to as the central dividing point).

Detection currents Ia, Ib, Ic and Id sent from quadrant light receiving elements 21a, 21b, 21c and 21d are respectively converted into voltages Va, Vb, Vc and Vd by amplification in a current-to-voltage conversion circuit 24. The current-to-voltage conversion circuit 24 is constituted by four sets of operational amplifiers respectively connected to the quadrant light receiving elements 21a to 21d and feedback resistors Ra, Rb, Rc and Rd. The converted voltages Va to Vd are determined by an arithmetic circuit 25 installed in the next stage such that the position of the light spot 23 can give information about the position of the objective lens in the bias direction and focusing direction. As a result, an X-direction output and a Y-direction output are transmitted. In FIG. 5, the X direction corresponds to the displacement of the objective lens in the bias direction, and the Y direction the displacement of the objective lens in the focusing direction.

For example, when the light source 22 moves along the X direction, the amounts of light received by the quadrant light receiving elements 21a and 21d increase (or decrease) while the amounts of light received by the quadrant light receiving elements 21b and 21c decrease (or increase). Therefore, the degree of displacement of the objective lens in the bias direction can be detected by the equation:

$$\text{X-direction output} = (Va + Vd) - (Vb + Vc)$$

Similarly, when the light source 22 moves along the Y direction, the degree of displacement of the objective lens in the focussing direction can be detected by the equation:

$$\text{Y-direction output} = (Va + Vb) - (Vc + Vd)$$

According to this theory, when the position of the light spot 23 on the four-quadrant light receiving element 21 in the X direction and in the Y direction is simultaneously detected, a position signal in the bias direction and a position signal in the focusing direction with respect to the objective lens can be detected. Additionally, the spurious tracking error signal can be cancelled by subtracting the position signal in the bias direction from the above-mentioned tracking error signal. This permits only the true tracking error signal to be transmitted, and therefore the objective lens can be controlled more accurately.

With this configuration, however, the gains with respect to the respective outputs from the quadrant light receiving elements 21a to 21d are fixed by the feedback resistors Ra to Rd in the current-to-voltage conversion circuit 24. Therefore, crosstalk, to be described later, occurs between the X-direction output and the Y-direction output of the arithmetic circuit 25. The crosstalk deteriorates the accuracy of the detection of the position of the light spot 23, and which also causes the accuracy of the position control of the objective lens to be deteriorated.

The relationships between the respective detection currents Ia to Id and the converted voltages Va to Vd are $$Va = Ia \cdot Ra, \quad Vb = Ib \cdot Rb, \quad Vc = Ic \cdot Rc, \text{ and } Vd = Id \cdot Rd$$

wherein Ra to Rd represent the feedback resistors respectively installed in the operational amplifiers. In other words, the feedback resistors Ra to Rd correspond to the gain of each operational amplifier.

Assuming that the respective gains are equal to each other, i.e. the feedback resistors Ra to Rd have the same value of resistance ($Ra = Rb = Rc = Rd = R$), the X-direction output and Y-direction output indicating the degree of displacement of the light spot 23 are as follows.

When the center of the light spot 23 is on the central dividing point of the four-quadrant light receiving element 21, the amounts of light received by the respective quadrant light receiving elements 21a to 21d become mutually the same, $Ia=Ib=Ic=Id$. In this state, when the light spot 23 moves in the positive X direction, the following equation can be expressed:

$$\begin{aligned} X\text{-direction output} &= (Va + Vd) - (Vb + Vc) \\ &= [(Ia - \Delta I)R + (Id - \Delta I)R] - \\ &\quad [(Ib + \Delta I)R + (Ic + \Delta I)R] \\ &= -4\Delta IR \end{aligned} \quad (1)$$

wherein $\Delta I$ indicates the change in the detection currents Ia to Id due to the changes in the light amounts received by the quadrant light receiving elements 21a to 21d.

In the above it is assumed that the feedback resistors Ra to Rd possess the same value of resistance, however after this the value of the resistance varies in each feedback resistor.

For instance, when the light spot 23 is displaced to the same degree as in the above case and the equations $Ra=GR(G\neq 1)$ and $Rb=Rc=Rd=R$ are expressed, $$\begin{aligned} X\text{-direction output} &= [(Ia - \Delta I)GR + (Id - \Delta I)R] - \\ &\quad [(Ib + \Delta I)R + (Ic + \Delta I)R] \\ &= -(G + 3)\Delta IR \end{aligned} \quad (2)$$

It is clear from the results of equation (1) and equation (2) that the sensitivity of the X direction output improves by $(G+3)/4$ times. However, an output from this kind of detector is normally corrected every time it is installed in a device, and therefore variations between devices do not raise a serious problem. Hence, fixed-value resistors are normally employed as feedback resistors.

The above explains the X-direction output detected when the light spot 23 shifts in the positive X direction. The following will discuss crosstalk, i.e. Y-direction output which becomes a spurious signal when the light spot 23 shifts in the X direction. When the equation, $Ra=Rb=Rc=Rd=R$, is expressed, the Y-direction output with respect to equation (1) is:

$$\begin{aligned} Y\text{-direction output} &= (Va + Vb) - (Vc + Vd) \\ &= [(Ia - \Delta I)R + (Ib + \Delta I)R] - \\ &\quad [(Ic + \Delta I)R + (Id - \Delta I)R] \\ &= 0 \end{aligned} \quad (3)$$

Namely, an output indicating the displacement in the Y direction, i.e. spurious signal, is not generated when the light spot 23 moves in the X direction.

In the meantime, when the value of resistance of the feedback resistors Ra to Rd varies from each other, Y-direction output with respect to equation (2) is given:

$$\begin{aligned} Y\text{-direction output} &= [(Ia - \Delta I)GR + (Ib + \Delta I)R] - \\ &\quad [(Ic + \Delta I)R + (Id + \Delta I)R] \\ &= (1 - G)\Delta IR \end{aligned} \quad (4)$$

Hence, a spurious signal, that indicates as if the light spot 23 moves both in the Y direction and X direction when the light spot 23 actually moves in the X direction, is generated, i.e. crosstalk occurs.

The amount of crosstalk can be measured by the ratio of the output representing the true displacement (2) to the output of spurious-signal (4):

$$\frac{(1 - G)\Delta IR}{-(G + 3)\Delta IR} = \frac{G - 1}{G + 3} \quad (5)$$

For example, when one of the feedback resistors has 1% error in resistance, the amount of crosstalk is calculated by substituting 1.01 for G in equation (5): about 0.25%.

Such a crosstalk will deteriorates the accuracy of the detection of the position of the objective lens and prevents the cancelation of spurious tracking error signal. In addition, when the mechanical characteristics of an optical disk, such as vibrations of the surface and eccentricity, are measured with the light spot position detector, the accuracy of measurement will be deteriorated due to crosstalk. Because the amount of crosstalk needs to be restrained to about 0.2% or less during the measurement of the mechanical characteristics. Thus the light spot position detector may not achieve the requirement with respect to crosstalk due to the accuracy of the feedback resistors Ra to Rd.

SUMMARY OF THE INVENTION

An object of the present invention to provide a light spot position detector which accurately detects the displacement of a light spot while restraining crosstalk, the light spot being projected onto a photodetector to measure the mechanical characteristics of an optical disk such as vibrations of the surface and eccentricity.

Another object of the present invention is to provide an optical head which has a light spot position detector for accurately detecting the displacement of an objective lens and executes accurate tracking control and focussing control.

In order to achieve the above objects, an optical head and a light spot position detector of the present invention, wherein the light spot position detector for detecting the displacement of an objective lens caused by tracking control and focusing control is characterized in comprising at least means (e) in addition to commonly provided means (a) to (d):

(a) light receiving means which is divided into four quadrant light receiving parts by two dividing lines that intersect each other at right angles (for example, four-quadrant light receiving element);

(b) projecting means for projecting a light spot onto the light receiving means (for example, light generating element);

(c) amplifying means for individually amplifying detection signals transmitted from the respective light receiving parts according to the light intensity of the light spot projected onto the light receiving means (for example, current-to-voltage conversion circuit);

(d) arithmetic means for calculating the two-dimensional position of the light spot according to the respective outputs from the amplifying means and for transmitting a first position signal and a second position signal corresponding to the two-dimensional position (for example, operational amplifier); and (e) gain adjusting means, which adjusts the gains of the amplifying means and the arithmetic means relating to the detection signals from the respective light receiving parts in order to restrain the amount of crosstalk between the first position signal and the second position signal within a given range (for example, variable resistor).

With the configuration of the light spot position detector, the light receiving parts respectively transmit detection signals according to the light intensity of the light spot on the light receiving means. When there are variations in gain of the amplifying means and of the arithmetic means with respect to the respective outputs from the light receiving parts, crosstalk occurs between the first position signal and the second position signal.

However, the light spot position detector of the present invention has the gain adjusting means for adjusting the gains of the amplifying means and the arithmetic means relating to the detection signals from the respective light receiving parts. Therefore, the amount of crosstalk between the first position signal and the second position signal is restrained within a given range by this means.

Further, when the optical head having the light spot position detector of the present invention is designed such that the movement of the objective lens causes a shift in the light spot on the light receiving means, the amount of crosstalk between the first position signal and the second position signal is also restrained within the given range. Accordingly, the two-dimensional position of the light spot on the light receiving means can be accurately detected, and which permits the displacement of the objective lens to be detected correctly. Consequently, tracking control and focusing control can be executed accurately.

Furthermore, since the gain adjusting means restrains the amount of crosstalk between the first position signal and the second position signal within the given range, the accuracy required in the installation of the light spot position detector in the optical head can be moderated.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a circuit diagram illustrating the structure of a current-to-voltage conversion circuit.

FIG. 2 is a circuit diagram illustrating a part of the structure of an arithmetic circuit.

FIG. 3 is an explanatory view illustrating the structure of a light spot position detector.

FIG. 4 is an explanatory view schematically illustrating the structure of an optical head.

DESCRIPTION OF EMBODIMENTS

Referring to FIG. 1 to FIG. 4, the following will explain one embodiment of the present invention.

Figure 4:
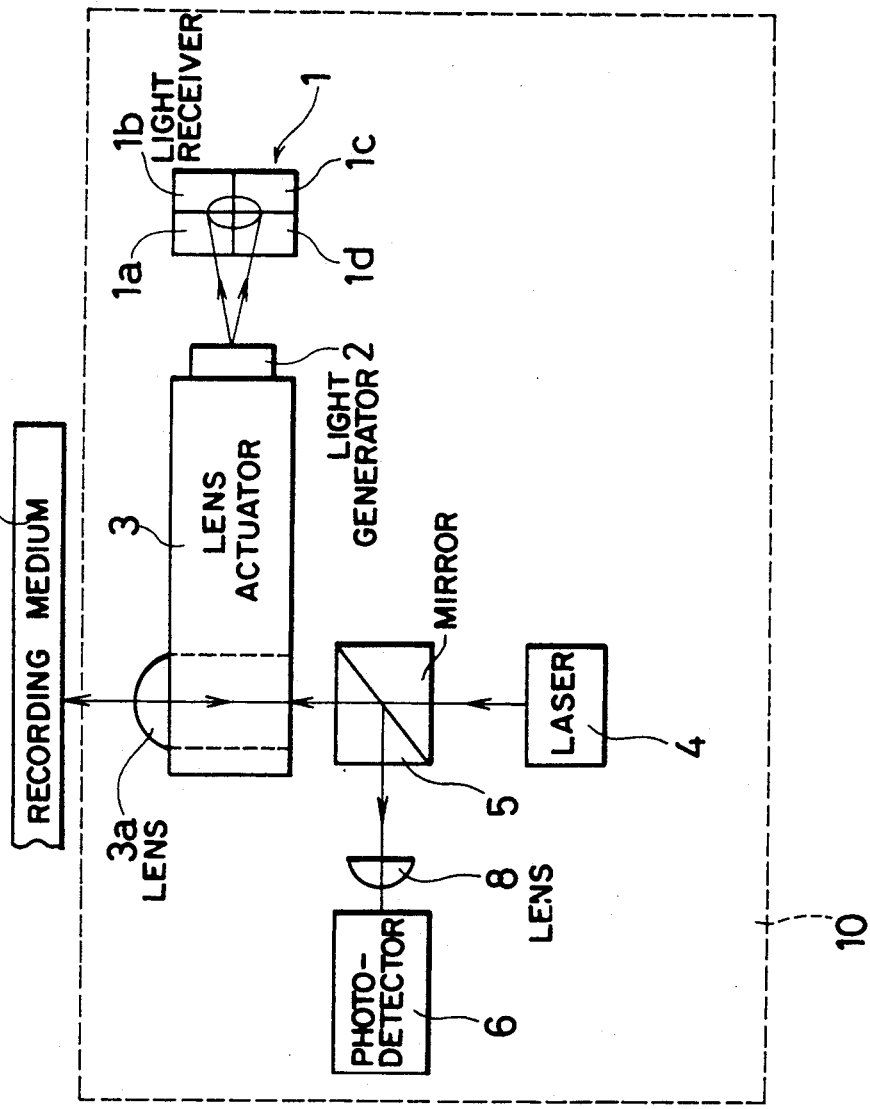
Figure 5:
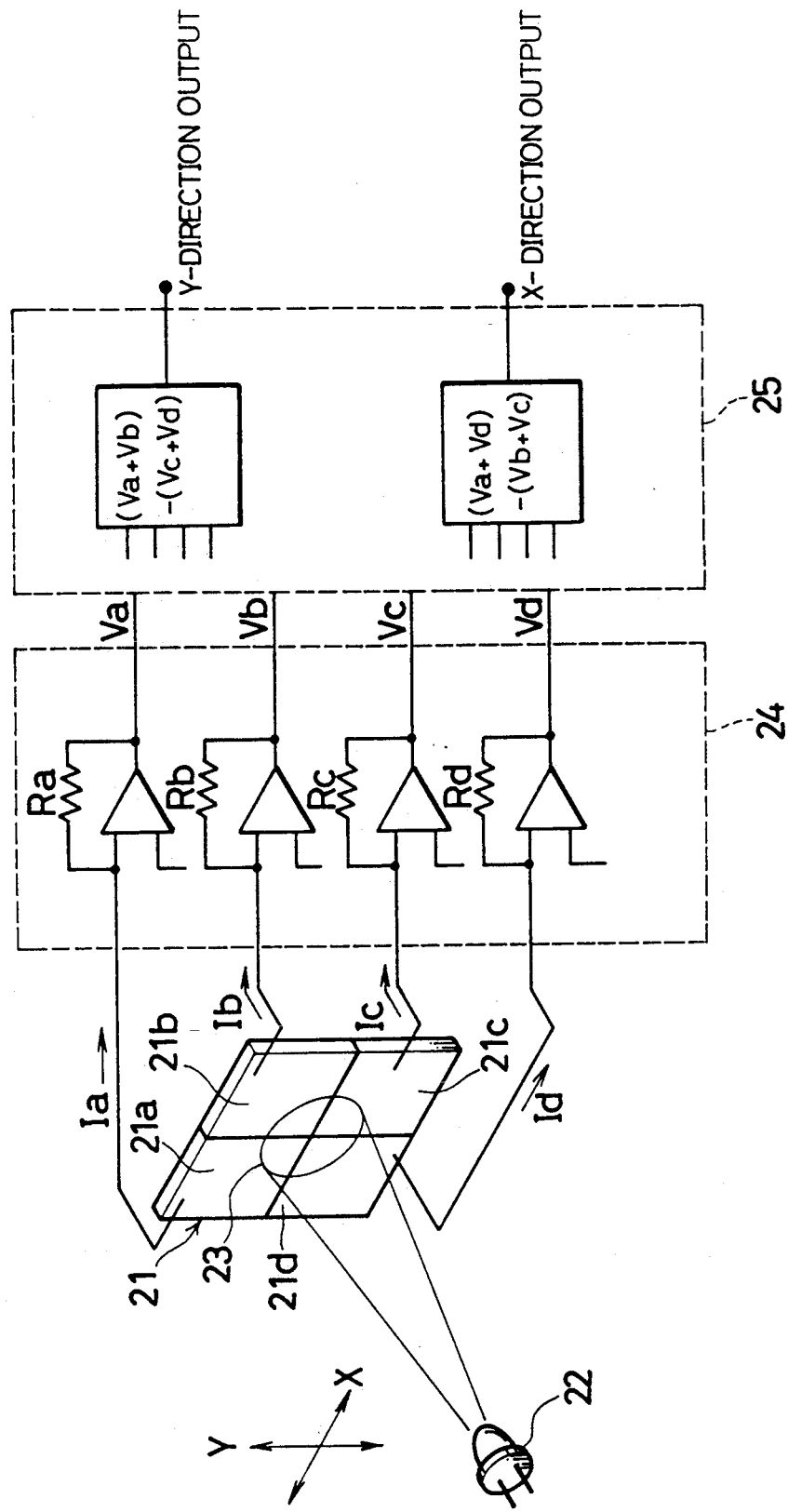
FIG. 5 is an explanatory view illustrating the structure of a conventional light spot position detector.

As shown in FIG. 4, an optical head 10 has an objective lens 3a for converging light on the recording surface of a disk-shaped optical recording medium 11. An objective lens actuator (actuating means) 3 of a substantial rectangular parallelopiped shape is mounted on the objective lens 3a. This objective lens actuator 3 drives the objective lens 3a in a focusing direction and a bias direction. Specifically, the focusing direction is a direction which intersects the recording surface at right angles, and the bias direction is orthogonal to both the focussing direction and a tangential direction of a track on the recording medium 11 whereon the light is converged.

Each of the objective lens actuator 3 and the optical head 10 has a driving coil and a permanent magnet, neither of them is shown in the figure. The objective lens actuator 3 and the objective lens 3a are driven in the focusing direction and the bias direction by the flow of current through the respective driving coils.

The objective lens 3a, a prism mirror 5 and a laser 4 are placed such that their centers are on a common axis, forming an optical axis. The reflecting surface of the prism mirror 5 is inclined at 45° to the optical axis. Meanwhile, a cylindrical lens 8 and a four-quadrant photodetector 6 are installed in a direction which crosses the optical axis at right angles on the reflecting surface of the prism mirror 5. The laser 4, prism mirror 5, cylindrical lens 8 and four-quadrant photodetector 6 are mounted in the main body of the optical head 10.

With the configuration of the optical head 10, light emitted from the laser 4 passes through the prism mirror 5 and is then converged onto a given point on the recording surface of a recording medium 11 by the objective lens 3a. The reflected light from the given point passes through the objective lens 3a, is reflected at an angle of 90° by the prism mirror 5 and then converged on the four-quadrant photodetector 6 by the cylindrical lens 8. Information on the recording medium 11 can be read out as the photodetector 6 detects the reflected light.

At this time, the objective lens 3a is controlled to be driven in the focussing direction and the bias direction by the objective lens actuator 3 such that light can be accurately converged on the given point on the recording medium 11. A focus error signal and a tracking error signal used for this control are generated by the four-quadrant photodetector 6 which detects the reflected light.

However, when the objective lens 3a is driven in the bias direction to have the tracking error signal equal zero, the central axis of the light beam emitted from the laser 4 does not pass through the center of the objective lens 3a. As a result, the path of the reflected light shifts. Therefore, the irradiating position of the reflected light on the photodetector 6 shifts. More specifically, there is a case where a tracking error signal is zero but the central axis of the light beam from the laser 4 does not pass through the center of the objective lens 3a. This means that a tracking error signal containing a spurious tracking signal which is affected by the shift of the path of light is zero. Accordingly, accurate tracking control can not be executed unless the spurious tracking error signal is eliminated from the tracking error signal.

To overcome this, a light spot position detector is installed in the optical head 10. The device detects a spurious tracking error signal by finding out the displacement of the objective lens 3a caused by the objective lens actuator 3a. Namely, the device functions with a light spot which shifts in accordance with the displacement of the objective lens 3a. More concretely, a light generating element (projecting means) 2 is mounted on one side surface of the objective lens actuator 3 which is substantially parallel to the optical axis, while a four-quadrant light receiving element (light receiving means) 1 is mounted in the main body of the optical head 10. The four-quadrant light receiving element 1 vertically receives light emitted from the light generating element 2 and detects the displacement of the light spot formed thereon.

Figure 3:
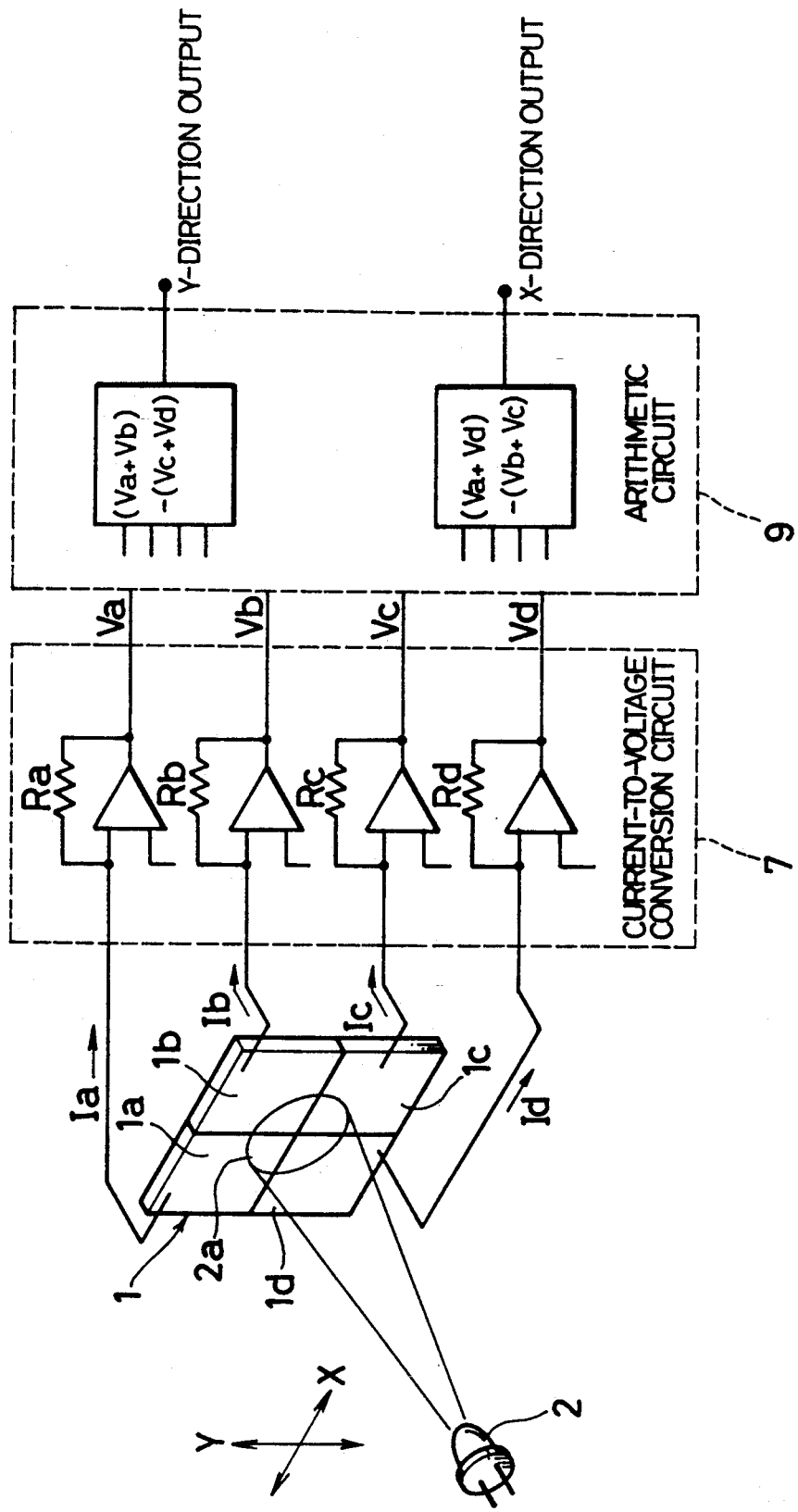

The four-quadrant light receiving element 1 is divided into four quadrant light receiving elements 1a, 1b, 1c and 1d by two dividing lines that intersect each other at right angles at the center of the element. One of the two dividing lines is substantially parallel with the optical axis. The light generating means 2 projects a light spot 2a onto the four-quadrant light receiving element 1. As shown in FIG. 3, the light receiving elements 1a to 1d output detection currents Ia, Ib, Ic and Id respectively according to the light intensity of the light spot 2a. The respective outputs from the light receiving elements 1a to 1d are consecutively connected to a current-to-voltage conversion circuit (amplifying means) 7 and an arithmetic circuit (arithmetic means) 9.

The detection currents Ia to Id are respectively converted into voltages Va, Vb, Vc and Vd by amplification in the current-to-voltage conversion circuit 7. Next, according to the converted voltages Va to Vd the arithmetic circuit 9 calculates an X-direction output and a Y-direction output indicating the two-dimensional position of the light spot 2a on the four-quadrant light receiving means 1. As shown in FIG. 3, the X direction and Y direction are determined to be parallel with two dividing lines respectively. The X direction corresponds to the displacement of the objective lens 3a in the bias direction, while the Y direction corresponds to the displacement thereof in the focussing direction.

With this arrangement, a spurious tracking error signal can be eliminated from a tracking error signal by the use of the X-direction output corresponding to the displacement of the objective lens 3a in the bias direction, enabling more accurate control of the objective lens 3a. Meanwhile, it is possible to make the X-direction output equivalent to the spurious tracking error signal by modifying the optical design with respect to the light intensity of the light spot 2a or the circuit design with respect to the detection currents Ia to Id.

Figure 1:
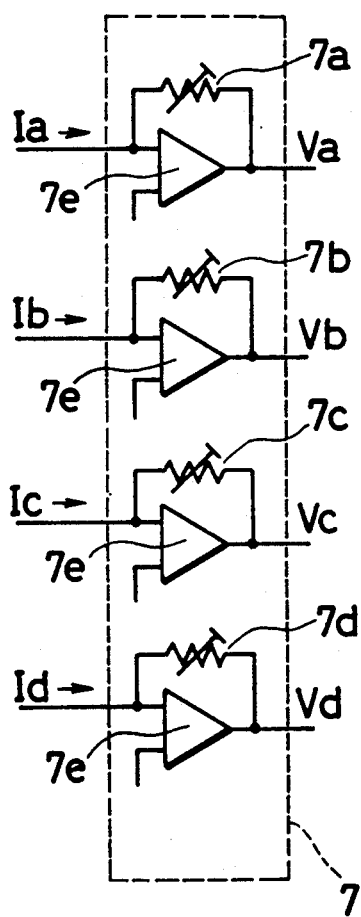
FIG. 1 to FIG. 4 show one embodiment of the present invention.

Moreover, as shown in FIG. 1, in the current-to-voltage conversion circuit 7 are installed operational amplifiers 7e for the respective detection currents Ia to Id from the light receiving elements 1a to 1d. As for feedback resistors installed in the respective operational amplifiers 7e, variable resistors (gain adjusting means) 7a, 7b, 7c and 7d are used instead of conventional fixed resistors. In other words, the output terminals of the operational amplifiers 7e for outputting the converted voltages Va to Vd are respectively connected through the variable resistors 7a to 7d to the input terminals to which the detection currents Ia to Id are respectively supplied. Therefore, the gains of the operational amplifiers 7e are respectively adjusted by the variable resistors 7a to 7d, and the detection currents Ia to Id are respectively converted into the voltages Va to Vd by amplification of the same gain.

Figure 2:
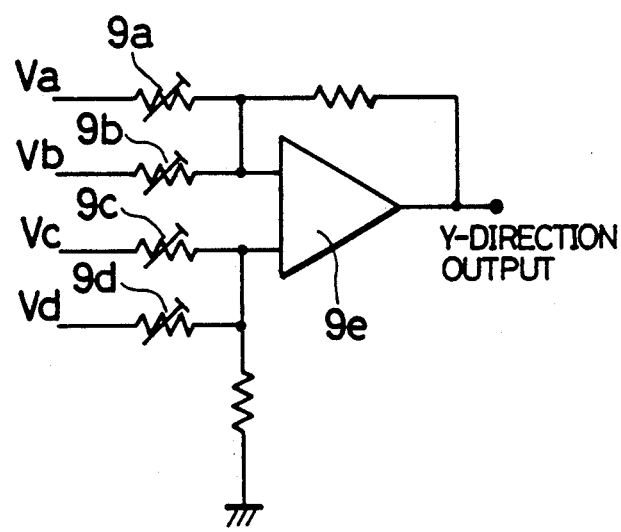

As shown in FIG. 2, the arithmetic circuit 9 for generating Y-direction output has an operational amplifier 9e. (Va+Vb) is supplied to the positive input terminal of the operational amplifier 9e, while (Vc+Vd) is supplied to the negative input terminal thereof. In the meantime, in order to generate X-direction output, although not shown in the figure, the converted voltage Vb to be sent to the amplifier 9e can be interchanged with the converted voltage Vd. Also, the gain of the amplifier 9e with respect to the converted voltages Va to Vd can be adjusted by making the converted voltages Va to Vd supplied to the operational amplifier 9e through variable resistors 9a, 9b, 9c and 9d. In the case of installing the variable resistors 9a to 9d, similar to the variable resistors 7a to 7d, they need to be adjusted such that the displacement of the light spot 2a in FIG. 3 can be accurately reflected in the X-direction output and Y-direction output.

As described above, with the configuration the variable resistors 7a to 7d are installed, whereby the gain of the current-to-voltage conversion circuit 7 can be adjusted with respect to individual detection current. In a conventional current-to-voltage conversion circuit, each gain is determined by the respective fixed resistors. Therefore, even when there are variations of about 1% in the respective fixed resistors, influential crosstalk corresponding to the spurious displacement of light spot occurs. On the contrary, in the above the variable resistors are respectively adjusted such that the gains of the operational amplifiers 7e are equal to each other. As a result, the amount of crosstalk can be restrained within a given range.

In consequence, the two-dimensional position of the light spot 2a on the four-quadrant light receiving element 1 can be detected very accurately and the position of the objective lens 3a which moves together with the light spot 2a can be found out more correctly. Hence, the objective lens 3a can be driven more accurately.

Besides, in the conventional case, a precise adjustment is required to arrange one of two dividing lines on the four-quadrant light receiving element to be parallel with the optical axis passing through the objective lens when installing the four-quadrant light receiving element in the optical head. Poor installation conditions increase the amount of crosstalk. In short, in the conventional case, the installation of the four-quadrant light receiving element requires much time to achieve very accurate installation, preventing improved productivity.

In the present invention, however, since crosstalk occurred can be cancelled by adjusting the variable resistors 7a to 7d, the four-quadrant light receiving element 1 can be installed without requiring such high accuracy. As a result, the installation can be carried out more easily, and thereby improving productivity.

In addition, in the conventional case, the amount of crosstalk varies depending on each optical head to be manufactured, and therefore the light spot position detector needs to be adjusted when installing an optical head in an optical recording and reproducing device. On the other hand, since the light spot position detector of the present invention can be adjusted in advance to restrain the amount of crosstalk within a given range, the difference in the amount of crosstalk between optical heads to be manufactured is diminished. Consequently, for example the operation required to readjust the position detector in the replacement of the optical head can be eliminated, improving the efficiency of the replacement.

The gain adjusting means is not necessarily installed in both the current-to-voltage conversion circuit 7 and the arithmetic circuit 9. In other words, the gain adjusting means can be installed such that the calculation with respect to the outputs from the light receiving elements 1a to 1d are performed by the circuits 7 and 9 whose gains are exactly the same on the whole or such that the amount of crosstalk is restrained within a given range. Moreover, individual gain adjusting means is not required for each of the outputs from the light receiving means 1a to 1d. Also the number of the gain adjusting means can be reduced if the amount of crosstalk is restrained within a given range. When the number of the gain adjusting means is reduced, needless to say, the operation for the gain adjustment is simplified. The concrete configuration of the gain adjusting means is not restricted to the one in the above embodiment, any means is acceptable if it can changes the relative valance in gain between the outputs from the light receiving means 1a to 1d.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light spot position detector comprising:
   light receiving means, which is divided into four quadrant light receiving parts by two dividing lines, the dividing lines intersecting each other at right angles, for receiving light;
   projecting means for projecting a light spot onto said light receiving means;
   amplifying means for individually amplifying detection signals outputted from said light receiving parts according to light intensity of the light spot on said light receiving means;
   arithmetic means for calculating a two-dimensional position of the light spot on said light receiving means according to outputs from said amplifying means and for generating a first position signal and a second position signal indicating the two-dimensional position; and
   gain adjusting means for adjusting gains of said amplifying means and arithmetic means with respect to the detection signals from said light receiving parts such that an amount of cross talk between the first position signal and the second position signal is restrained within a given range.

2. An optical head comprising:
   an objective lens for converging light on an optical recording medium;
   actuating means for actuating said objective lens to provide tracking control and focusing control;
   light receiving means, which is divided into four quadrant light receiving parts by two dividing lines and installed in said optical head, the dividing lines intersecting each other at right angles, for receiving light;
   projecting means for projecting a light spot on said light receiving means, the light spot shifting according to a displacement of the said objective lens driven by said actuating means;
   amplifying means for individually amplifying detection signals from said light receiving parts according to light intensity of the light spot on said light receiving means;
   arithmetic means for calculating a two-dimensional position of the light spot on said light receiving means according to outputs from said amplifying means and for transmitting a first position signal and a second position signal indicating the two-dimensional position; and
   gain adjusting means for adjusting gains of said amplifying means and said arithmetic means with respect to the detection signals from said light receiving parts such that an amount of crosstalk between the first position signal and the second position signal is restrained within a given range.

3. The light spot position detector as defined in claim 1, wherein said gain adjusting means is a variable resistor forming a feedback loop with a set of an output and an input of said amplifying means, at least one feedback loop being formed with respect to the outputs of said amplifying means.

4. The optical head as defined in claim 2, wherein said gain adjusting means is a variable resistor forming a feedback loop with a set of an output and an input of said amplifying means, at least one feedback loop being formed with respect to the outputs of said amplifying means.

5. The light spot position detector as defined in claim 1, wherein said gain adjusting means is a variable resistor which is connected in series with at least one output of said amplifying means.

6. The optical head as defined in claim 2, wherein said gain adjusting means is a variable resistor which is connected in series with at least one output of said amplifying means.

7. The light spot position detector as defined in claim 1, wherein said four light receiving parts are divided into two groups by a first dividing line of said two dividing lines which is parallel to a first direction, a first group being formed by first and second light receiving parts, a second group being formed by third and fourth light receiving parts;
   said arithmetic means calculating a difference between a sum of a first gain adjustment signal and a second gain adjustment signal passed through said amplifying means and said gain adjusting means and a sum of a third gain adjustment signal and a fourth gain adjustment signal passed through said amplifying means and said gain adjusting means and transmiting the second position signal and the first to fourth gain adjustment signals corresponding to the first to fourth light receiving parts respectively.

8. The light spot position detector as defined in claim 7, wherein said four light receiving parts are divided into two groups by a second dividing line of said two dividing lines parallel to a second direction which is orthogonal to the first direction, a third group being formed by the first and fourth light receiving parts, a fourth group being formed by the second and third light receiving parts;
   said arithmetic means calculating a difference between a sum of the first and fourth gain adjustment signals passed through said amplifying means and said gain adjusting means and a sum of the second and third gain adjustment signals passed through said amplifying means and said gain adjusting means and transmitting the first position signal and the first to fourth gain adjustment signals corresponding to the first to fourth light receiving parts respectively.

9. The optical head as defined in claim 2, wherein said four light receiving parts are divided into two groups by a first dividing line of said two dividing lines which is substantially parallel to a first direction, a first group being formed by first and second light receiving parts, a second group being formed by third and fourth light receiving parts, the first direction corresponding to a bias direction which is orthogonal to both a focussing direction, the focussing direction being parallel to an optical axis of said objective lens, and a tangential direction of a track on the optical recording medium whereon light is irradiated;
   said arithmetic means calculating a difference between the sum of the first and second gain adjustment signals passed through said amplifying means and said gain adjusting means and the sum of the third and fourth gain adjustment signals passed through said amplifying means and said gain adjusting means and transmiting the second position signal which corresponds to a displacement of said objective lens in the focussing direction and the first to fourth gain adjustment signals corresponding to the first to fourth light receiving parts respectively.

10. The optical head as defined in claim 9, wherein said four light receiving parts are divided into two groups by the second dividing line of said two dividing lines parallel to the second direction corresponding to the focussing direction, a third group being formed by the first and fourth light receiving parts, a fourth group being formed by the second and third light receiving parts;

said arithmetic means calculating a difference between the sum of the first and fourth gain adjustment signals passed through said amplifying means and said gain adjusting means and the sum of the second and third gain adjustment signals passed through said amplifying means and said gain adjusting means and transmiting the first position signal which corresponds to a displacement of said objective lens in the bias direction and the first to fourth gain adjustment signals corresponding to the first to fourth light receiving parts respectively.

11. The optical head as defined in claim 10, further comprising:

first means for detecting a tracking error and a focussing error based on reflected light from the optical recording medium and for generating a tracking error signal and a focussing error signal therefrom; and second means for generating a differential signal, the differential signal being obtained by subtracting said first position signal from said tracking error signal;

said actuating means activating said objective lens to make said differential signal equal zero, thereby controlling the tracking of said objective lens.

12. A light spot position detecting method comprising the steps of:
   (a) receiving light by a detector, which is divided into four quadrant light receiving parts by two dividing lines, the dividing lines intersecting each other at right angles;
   (b) individually amplifying detection signals generated by said step (a) according to light intensity of the light spot on the photodetector;
   (c) calculating a two-dimensional position of the light spot on the photodetector and generating a first position signal and a second position signal indicating the two-dimensional position; and
   (d) adjusting gains of the amplification of said step (c) and gains realized in said step (c) with respect to the detection signals such that cross talk between the first position signal and the second position signal is controlled.

13. The method as defined in claim 12, wherein said step (d) uses a variable resistor forming at least one feedback loop for the amplification process of said step (b).

14. The method as defined in claim 12, wherein said step (d) uses a variable resistor functioning in series with said steps (b) and (c).

15. The method as defined in claim 12, further comprising the steps of:
   (e) detecting a tracking error and a focussing error based on light reflected from an optical recording medium and generating a tracking error signal and a focussing error signal therefrom;
   (f) generating a differential signal, the differential signal being obtained by subtracting the first position signal from the tracking error signal; and
   (g) controlling the tracking of an objecting lens in response to the differential signal.

* * * * *